US008441959B2

(12) United States Patent
Erdmann et al.

(10) Patent No.: US 8,441,959 B2
(45) Date of Patent: May 14, 2013

(54) METHOD OF ESTABLISHING A WIRELESS MULTI-HOP NETWORK

(75) Inventors: Bozena Erdmann, Aachen (DE); Armand Michel Marie Lelkens, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 268 days.

(21) Appl. No.: 12/994,160

(22) PCT Filed: May 27, 2009

(86) PCT No.: PCT/IB2009/052228
§ 371 (c)(1),
(2), (4) Date: Nov. 23, 2010

(87) PCT Pub. No.: WO2009/147584
PCT Pub. Date: Dec. 10, 2009

(65) Prior Publication Data
US 2011/0063999 A1    Mar. 17, 2011

(30) Foreign Application Priority Data

Jun. 4, 2008 (EP) .................................. 08104253

(51) Int. Cl.
H04L 1/00         (2006.01)
H04L 12/26        (2006.01)
H04L 12/66        (2006.01)
H04W 4/00         (2009.01)

(52) U.S. Cl.
USPC ........................... 370/254; 370/329; 370/463

(58) Field of Classification Search ................ 370/254, 370/328, 329, 431, 463
See application file for complete search history.

(56) References Cited

U.S. PATENT DOCUMENTS

| 8,102,814 B2 * | 1/2012 | Rahman et al. ............... 370/331 |
| 2005/0180447 A1 | 8/2005 | Lim et al. |
| 2006/0234756 A1 | 10/2006 | Yamasaki et al. |
| 2007/0064634 A1 | 3/2007 | Huotari et al. |

FOREIGN PATENT DOCUMENTS

| WO | 2007065987 A1 | 6/2007 |
| WO | 2007102112 A1 | 9/2007 |

OTHER PUBLICATIONS

Kummer et al: "Building Multicast Trees in Ad-Hoc Networks"; Proceedings of the 5th MiNEMA Workshop (Middleware for Network Eccentric and Mobile Applications), Sep. 11-12, Magdeburg, Germany, pp. 8-12.
Zigbee Specification, Document 053474r17, Jan. 2008, Chapter 3.6, pp. 347-417, Retrieved From the Internet: URL:http://www.zigbee.org>, on Aug. 19, 2009.

* cited by examiner

*Primary Examiner* — Ronald Abelson

(57) ABSTRACT

A method of establishing a wireless multi-hop network where devices establish a physical wireless connection to at least another device of the network in a self-organizing process. In the self-organizing process, a seeking device intending to join the network listens for beacon signals, emitted by candidate parent devices already in the network, that include a network identifier and a device identifier of the emitting devices. Then, in a parent selection process, the seeking device selects a parent device from among the candidate parent devices, according to given selection rules, based on the network identifiers, acceptance capabilities of the candidate parent devices, and link quality parameter values relating the device and the candidate parent devices. In this parent selection process, application-level connection data of the seeking device and/or the candidate parent devices are applied. The seeking device connects physically, and preferably also logically, via the selected parent device to the network.

22 Claims, 8 Drawing Sheets

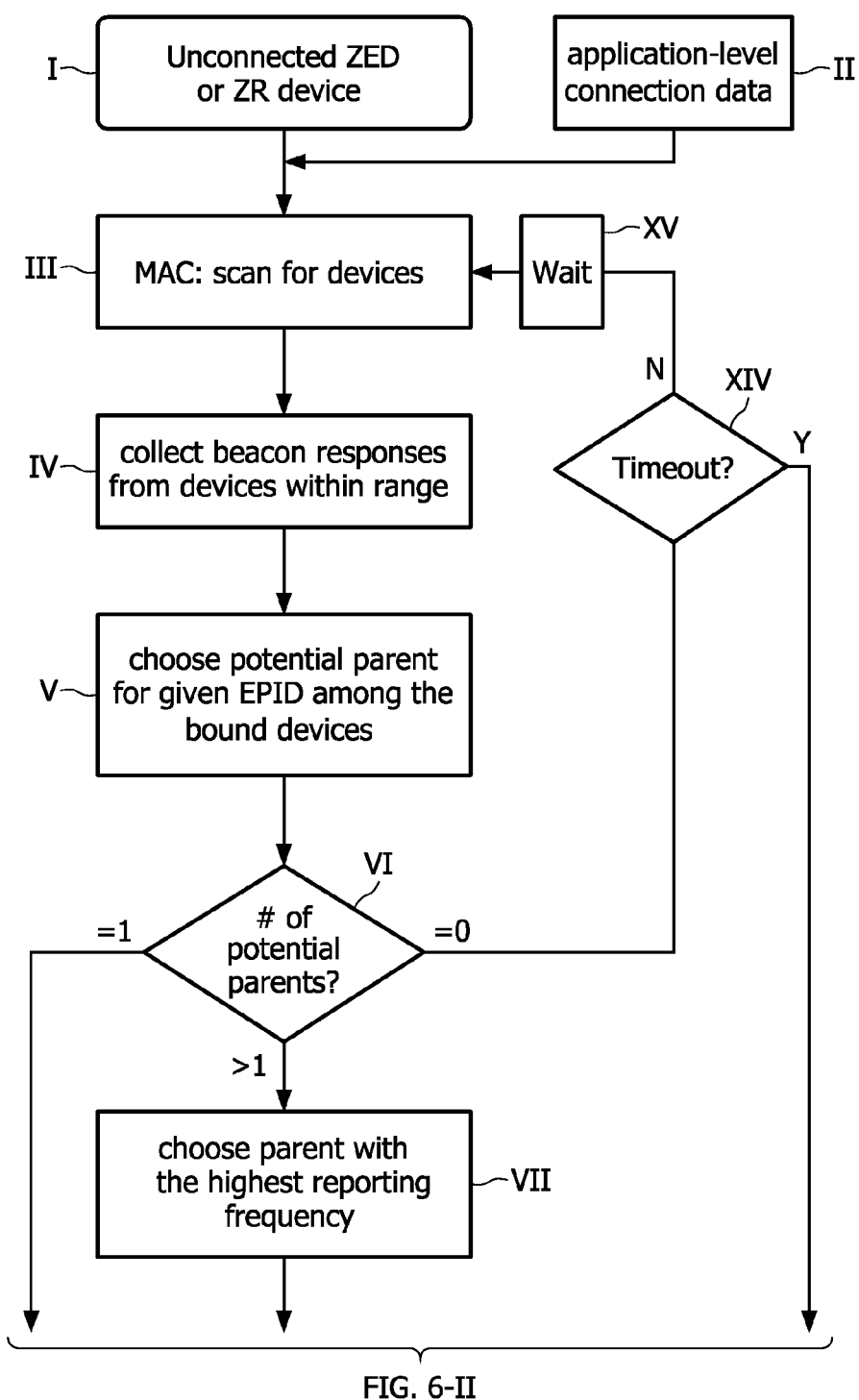

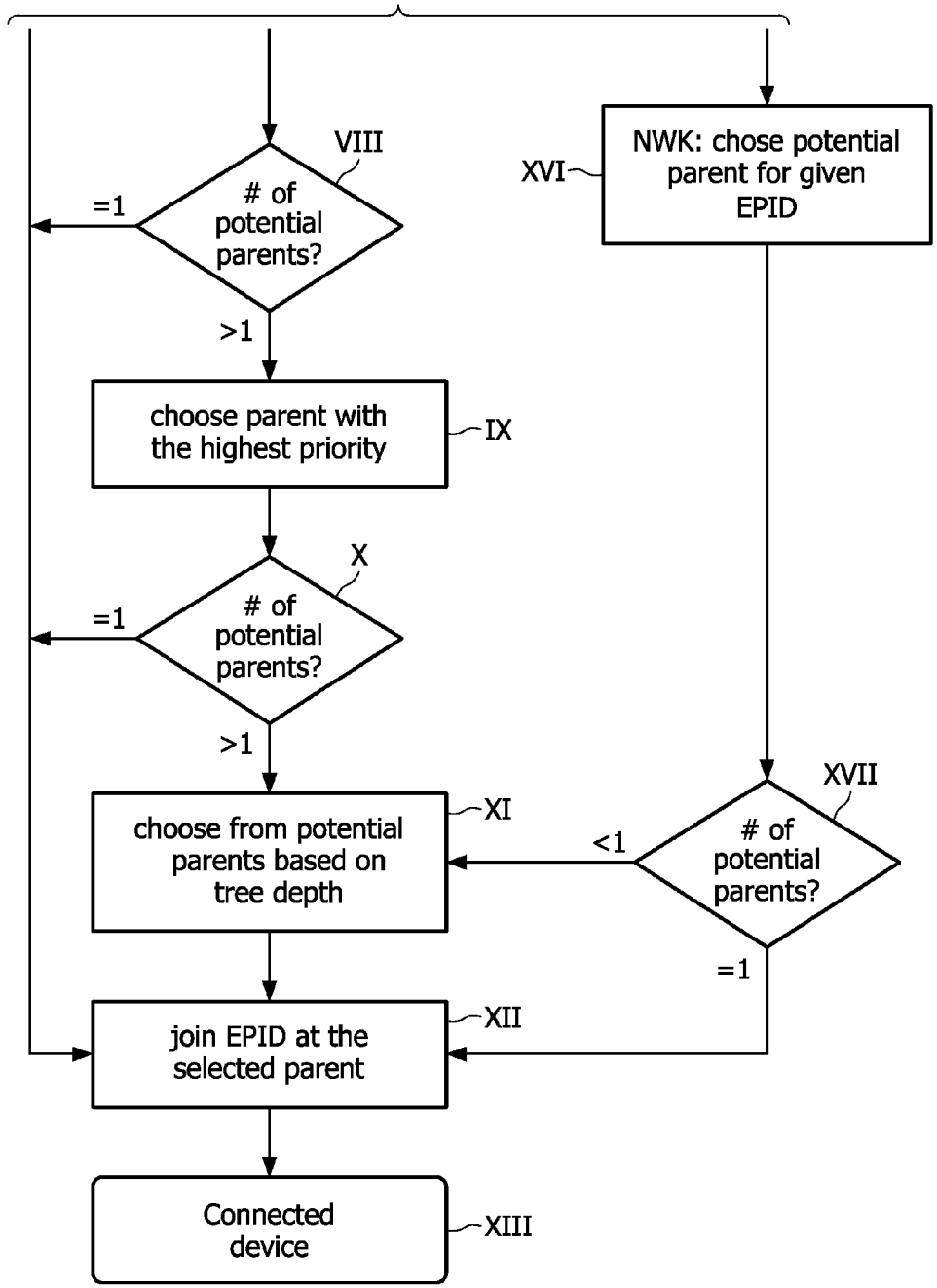
FIG. 6-II

METHOD OF ESTABLISHING A WIRELESS MULTI-HOP NETWORK

FIELD OF THE INVENTION

The invention describes a method of establishing a wireless multi-hop, preferably mesh, network, in particular a ZigBee-type network, comprising a plurality of devices in a device arrangement. The invention further describes a device comprising a network interface for connecting a wireless multi-hop network.

BACKGROUND OF THE INVENTION

Use of wireless networks is becoming widespread in business (commercial, industrial, institutional) and also consumer markets for the automatic control of various device arrangements. Examples are building automation systems, e.g. for lighting, heating & ventilation, safety, etc., comprising devices such as light ballasts, switches, dimmers or other control elements, daylight/occupancy sensors, actuators, meters etc. Use of wireless control makes the automation devices independent of the mains power as control medium, thus allowing freedom of device placement, since control of the devices is no longer dependent on power wires and power outlets, and allowing greater device portability, at least for those devices which may be battery-powered such as switches and sensors. Typical examples for such wireless personal networks (WPAN) are ZigBee (IEEE 802.15.4), Bluetooth, HomeRF or Wi-Fi networks.

In many cases, the transmit range of the air interfaces between the devices is smaller than the dimensions of the network, and it may be necessary, for an application-level connection, for a first device to establish a network path (in the following also referred to as "route") to a second device via a number of third devices which pass a message from the first device to the second device. Such a network in which, on application-level, a sending device transmits a message to a receiving device using other devices as intermediate stations is referred to as a "multi-hop" network. Thereby, the network path between a sending and a receiving device may be established in a self-organizing manner according to rules of the relevant network standard. For it, physical connections—i.e. the fact of devices being directly in each others radio range, especially in mesh networks—and logical connections—i.e. the special relationships between the nodes, especially in a tree-based topology—are used. The physical and logical connections between the devices may be established in an initialisation process, for example, when a device joins the network. In another example, a network path may be established when it is needed, in an ad-hoc manner, in particular when a previous network path breaks down, for example, owing to the failure of an intermediate device in the path.

Currently, ZigBee is the only standard low-power, low-footprint WPAN technology that allows self-organization to a large extent. ZigBee offers two ways of establishing the network topology: 'DirectJoin' and free association, whereby in both cases a tree structure may be established, which is the preferred allocation for smaller networks, or a stochastic structure may be established which can be a favourable solution for larger networks. The device at which the new device joins is called the 'parent device' of the joined device ('child device').

DirectJoin method requires the user to pre-define the parent-child relationships for all devices in the network. Besides placing a high burden on the user (especially in large networks with thousands of nodes), this requires expert tools to measure radio range and/or expert knowledge on wireless propagation, and is associated with a high maintenance effort when alterations or adaptations must be made to the network. This is undesirable in the instable, multipath-susceptible wireless environment.

The free association procedure allows a seeking device (either a completely new one or one that had been in the network before) intending to join the network, to select a parent node according to pre-defined criteria. In the ZigBee standard, both reduced-function ZigBee End Devices (also referred to as 'ZED' in the following) and ZigBee Routers (also referred to as 'ZR' in the following) attempt to select as a parent a router for which all the following conditions are true:

1. The router belongs to the network identified by a particular network identifier ('ExtendedPANId parameter' or 'EPID' in the ZigBee-standard);
2. The router is open to join requests and advertises capacity of the correct device type (ZigBee Router or ZigBee End Device);
3. The announced 'update id' is recent;
4. The link quality for frames received from this device is such that a link cost of at most 3 is produced. [ZigBee-2007, 053474r17, sec. 3.6.1.4.1.1, p. 352, 1. 1 ff], whereby, the link cost is calculated as $$C\{1\} = \begin{cases} 7, \\ \min\left(7, \text{round}\left(\frac{1}{p_1^4}\right)\right) \end{cases} \qquad (1)$$

where $p_1$ is the probability of packet delivery on the link 1 and can be arrived at by analyzing packet error rates and/or signal properties such as Energy Detection and/or Signal-to-Noise ratio values; at ZigBee implementer's discretion.

5. If more than one device meets these four requirements, then, according to the ZigBee standard, the joining device shall select the parent with the smallest tree depth. [ZigBee-2007, 053474r17, sec. 3.6.1.4.1.1, p. 352, 1.18 ff]. If more than one potential parent has the smallest depth the device is free to choose from these.

On initial network formation, the devices will not yet have a good estimate of the link cost since very few packets will have been sent/received by then. When the default value of 7 is taken for the link cost (see equation (1)), all possible parents meet the requirements 1-4 with a tie on the fourth requirement, which will effectively cause the node to apply the fifth rule only, i.e. to choose the parent highest in the network tree (with the lowest tree depth).

Therefore, the above free association method may result in network topologies that are very dense in close proximity to the tree root—i.e. to the ZigBee PAN Coordinator (in the following also named 'ZC'), which forms the root of the network logical structure (esp. tree)—and may result in parent-child links of potentially poor quality (at least, higher quality links might be available). As a result, the performance of the network may be less than optimal with regard to both delay and reliability of packet delivery. This is especially true for the networks incorporating ZEDs, which are compelled by the standard to communicate solely via their parent.

Many ZED-like reduced-function, battery-operated devices are expected in the ZigBee-like networks, because the strength of the wireless control lies in its independence of mains power. The control devices—switches, sensors, remote controllers (RC), etc., using radio mostly in reaction to user input or sensed environmental change—are expected to be battery-operated ZEDs. Multiple devices may be controlled by them, including packet-loss sensitive and time-critical applications like light switching, requiring—despite ZED's reduced functionality—certain network performance level. Furthermore, it is desirable to maximize network reliability, and thereby conserve ZED's energy, by keeping the number of re-transmissions associated with a command to a minimum.

Therefore, it is an object of the invention to provide a more intelligent self-organization method for the formation of wireless multi-hop networks, in particular ZigBee-type networks that include ZEDs, and to provide a device comprising a network interface for connecting a wireless multi-hop network according to this method.

SUMMARY OF THE INVENTION

To this end, the present invention describes a method of establishing a wireless multi-hop network comprising a plurality of devices in a device arrangement, in which method devices establish a physical wireless connection to at least another device of the network in a self-organizing process in which self-organizing process a seeking device, intending to join the network, listens for beacon signals emitted by candidate parent devices already in the network, wherein a beacon signal comprises a network identifier and a device identifier of the emitting device;

the seeking device selects a parent device from among the candidate parent devices in a parent selection process, according to given selection rules, based on the network identifiers (EPID), acceptance capabilities of the candidate parent devices, and link quality parameter values relating the device and the candidate parent devices, in which parent selection process further application-level connection data of the seeking device and/or the candidate parent devices are applied;

and the seeking device connects physically, and preferably also logically ("associates" is the term used in the Zig-Bee-standard), via the selected parent device to the network.

In a ZigBee network the candidate parent devices are the ZRs (or a ZC) sending their ExtendedPANId parameter as a network identifier and IEEE address as device identifier in a so-called "beacon" signal as a response signal to a beacon request signal of a seeking device. The acceptance capability is the capability of the candidate parent device to accept a device of a specific type, e.g. a ZED or a ZR, as a further child, which information is also included in the beacon signal. The link quality parameter value may be the link costs determined according to equation (1).

In contrast to the current standard, application-level connection data are now taken into account in the parent selection process. Such application-level connection data may be any data disclosing to which other device a device is directly or indirectly bound or connected on an application-level, as well as how important this binding is, e.g. whether a switch is bound to a luminaire controlled by the switch, or whether two or more luminaires are in the same functional group and are controlled by a common switch, or which of the two monitor stations a sensor has to report to more frequently. Using this method, the closest bound device, i.e. the candidate parent device which has best link quality and is bound to the seeking device, is preferably chosen as the parent device. As will be shown later, this approach leads, in a very simple way, to an enormous improvement in the performance of a tree structure network established by a self-organizing method, since the number of hops used to establish the network path may be reduced considerably.

An appropriate device comprises a network interface for connecting such a wireless multi-hop network, which network interface comprises a listening unit which listens, when the device is intending to join the network, for beacon signals emitted by candidate parent devices already in the network which beacon signals comprise network identifier and device identifier of the candidate parent devices, a parent selection unit for selecting a parent device from among the candidate parent devices, according to given selection rules, based on the network identifiers (EPID), acceptance capabilities of the candidate parent devices, and link quality parameter values for the link between the device and the candidate parent devices, which parent selection unit is realised such that it also applies application-level connection data of the device and/or the candidate parent devices in a parent device selection process, and a connection unit for establishing a physical, and preferably also a logical, connection in the network between the device and the selected parent device.

The invention is preferably used for networks of the Zig-Bee-type but may also be used for other similar multi-hop networks that are able to establish physical, and preferably also logical, connections between the network nodes in a self-organizing process.

In a preferred embodiment of the invention, a seeking device sends a request signal to devices already in the network. A number of candidate parent devices that receive the request signal may then each emit a beacon signal as a response. Such a request signal for scanning for possible parent devices may be broadcast by a scan unit or module of the network interface. This method is simpler and less energy consuming since the candidate parent devices need not broadcast a beacon signal continuously, but only when a device intends to join the network.

If a seeking device receives a beacon signal from a device with the correct network identifier, the seeking device can then request that emitting candidate parent device to accept it as a child. In order to reduce data traffic, the beacon signals of a candidate parent device preferably already comprise an acceptance capability for that device type (in ZigBee: ZR or ZED).

Furthermore, the beacon signal may already comprise tree depth information of the emitting candidate parent device, indicating the number of nodes between the emitting candidate parent device and a root of the network tree structure, for example, the ZigBee-Coordinator in a ZigBee-network. Such tree depth information may then also be taken into account in the parent selection process. For example, in the case of two equally suitable candidate parent devices, in consideration of the application-level connection data, the candidate parent devices with the smaller tree depth may be chosen in a manner similar to the current ZigBee-standard.

As mentioned above, the application-level connection data may be any data that define to which other device a device is directly or indirectly bound or connected to on an application-level, or the importance of this binding. On the basis of this data, a seeking device can favourably select as parent device a device that, on an application-level, acts as a controller for that seeking device or that is, on an application-level, controlled by that seeking device. For example, in a ZigBee-network a switch (ZED or ZR) may choose one of the ZR luminaires which are controlled by it.

This requires devices to know the other devices with which it will communicate on the application layer. This can be easily achieved, for instance, if the application-level connection data comprises a collection, for example a simple list, of device identifiers of other devices to which the devices should be connected on an application level. This identifier collection or list (referred to in the following as "binding table") may be stored in an appropriate memory of the network interface.

In this way, for example, a controller could select as parent one of the devices it is bound to by comparing the device identifiers in the beacon signal and stored in the binding table. For this purpose, the unique 64-bit long addresses of the devices in a ZigBee-network are preferably used as device identifiers.

In extension to the rules defined for the controller ZEDs in the approach described above, other devices to be controlled by the same controller, could, if possible, especially if they are ZEDs themselves, select as their parent the parent of the controller in order to minimize the number of hops.

The devices of the device arrangement may be grouped into functional groups and the application-level connection data might comprise group membership data. By also using common group membership as a criterion for parent selection as well, a reduced number of hops in application-level connection can be achieved. However, this requires group membership configuration prior to association, and knowledge of other group members, which may be supplied in the form of a simple group identifier in the beacon signal.

The bindings and/or functional groups are preferably configured in the usual commissioning phase, so that the application-level connection data are available for parent selection for a device intending to join an operational network. They may also be statically pre-configured, e.g. by device (set) vendor or a system integrator, e.g. established via Out Of Band methods.

In a preferred embodiment of a ZigBee-network, the application-level connection data comprise binding data in an Application Support Sublayer (APS). Alternatively, the applications could be provided with this information directly, i.e. application-level connection data are directly associated to application objects of the devices, without using the APS binding mechanism. In the following therefore, for simplicity, any logical connection on application-level between a source device and a destination device may be referred to as "binding" and the respective devices may be referred as "bound devices", regardless of whether the APS binding mechanism is used or not.

As explained above, a seeking device should preferably select a parent from among the candidate parent devices to which it is bound. However, particularly when a new network is being established, those bound devices may not yet be in the network when the seeking device tries to join. Thus, in a preferred embodiment a seeking device sends a new request signal if, subsequent to the first request signal, it does not receive a response signal from a candidate parent device to which the requesting device should be connected on an application level, according to the application-level connection data. In this way, the seeking device, especially a ZED, could postpone, preferably within a given time limit, the association until at least N of the bound devices (N being 1 or more) are discoverable by the initial scan, since the seeking devices "knows" that the bound devices will join the network. This will allow for formation of even more efficient topologies, while not delaying the network formation. The information about which bound devices located in the neighborhood, if any, may e.g. be collected during the commissioning phase and stored. For example, the beacon signals of the potential parents collected during the commissioning phase may be stored with the application-level connection data in the memory of the seeking device.

When a seeking device joins a network, in particular a network which is in the process of being established, the seeking device may find a bound parent device which is the closest at that time. However, other possible suitable parent devices that are even closer might have started later and cannot therefore be found by that seeking device during association. To remedy this situation, in a preferred embodiment of the invention, a device waits for a given delay time after an initial start-up before seeking a parent device. For example, the seeking devices could by default delay their initial association procedure, which might involve broadcasting the request signal, so that they can select a parent device from a larger number of available, already associated, devices. This could be realized e.g. as a default sleeping period after power-up and/or reset; preferably only in operational mode and not in commissioning mode. As opposed to simply extending ScanDuration in the current ZigBee-standard, this method does not increase the initial energy consumption by the seeking devices.

The ZigBee specification allows a Full Functional Device to associate either as a ZR, or —if that not possible owing to potential parents' addressing space or memory entries for children being exhausted—to associate as a ZED. For a Full Functional Device that cannot find a parent device according to the standard ZigBee approach as a ZR (esp. due to unfulfilled criteria 2 and 4), it may be more beneficial to become a ZED child of this nearby bound router, instead of associating as a ZR to a more remote bound or unbound router. Therefore, in a further preferred embodiment of the invention, a seeking device with full function device capability may connect physically as a reduced function device to another router device having no further acceptance capability for a network router device, if that network router device is the most suitable candidate parent device, according to the application-level connection data. This approach will further improve the performance of networks that employ tree routing.

If many candidate parent devices fulfilling the criterion of one of the above methods are available, the seeking device could select the one with the strongest signal. Preferably, according to criterion 4 of the standard ZigBee association process explained above, the link quality parameter values relating the seeking device and the candidate parent devices are applied in the parent device selection process. In this way, the seeking device increases the probability of delivering the application message to at least one bound device and reduces the number of network hops required for this delivery.

In another embodiment, to select a parent from among many bound devices in its vicinity fulfilling all of the above-discussed network and application criteria, the seeking device could use any further application data in the form of an indication of how often the application messages will be sent to particular bound devices, such as the maximum or minimum update interval set by the application. The seeking device may then select as parent device the device with which it will most often communicate, thus optimizing for the biggest contributor to its traffic flow, by reducing this communication to one hop.

In yet another embodiment, if priorities and/or quality of service indicators are defined, e.g. attributing importance levels for selected commands and/or parameters, to particular logical connections, ports or sockets or complete applications, whether assigned by device manufacturer or in the process of commissioning, the seeking device may select from among the bound devices for its parent that device that has the highest priority and/or the most strict QoS (quality of service) requirements (e.g. minimum delay, maximum reliability). To this end, regarding a given application-level connection between the seeking device and a device which is bound to the seeking device on an application level, the application-level connection data may preferably comprise, a quality of service indicator and/or priority data and/or data regarding an estimated application-level message frequency between the seeking device and the corresponding bound device. For example, in ZigBee such indicators could be included in the seeking device's binding table.

The applicability of the method according to the invention could be limited to only some device types or device roles. Some devices, despite being end devices and/or battery powered, may not require this method. For example the central light switch for an entire building may not be in the immediate vicinity of any of its bound devices and/or may not require fast response times. The information collected in the commissioning phase, if used, can be used to determine this case. As another example, a portable remote controller may not be permanently bound to any device; it may benefit from associating quickly to the first device in its vicinity with reasonable link costs.

When a seeking device determines that none of the bound devices have the capacity to accept new children, either because they are not routers, or their child capacity is exhausted, or because they don't fulfill the other parent selection criteria, the seeking device may revert to the standard procedure.

Preferably, a device already joined in the network may also exchange its parent device if it receives new application-level connection data. For example, if after network formation (according to the standard method or one of the methods disclosed above), the application-layer messages are not reliably delivered, the seeking device could decide to replace its parent. In a ZigBee network, this could be triggered, for instance, by a lack of the end-to-end application level responses, APS level ACKs, the MAC level ACKs (from the parent), and/or changing link costs. Proactive substitution of the parent may be required, if the binding information becomes available only after joining the network, e.g. if no commissioning phase is used.

The same procedures as described above can be used by a device that tries to re-join the network; e.g. an orphaned device—i.e. a device that lost the connection to its parent, e.g. due to parent removal or wireless propagation change. Relying on the link cost and performance data collected previously when joined to the network, the device can choose the new parent, taking the application-layer data into account.

Evidently, the parent device could also use the application-layer data before accepting an association request or join request from a child. For example, when the parent can only accept one child, and it receives the association request from two potential children at essentially the same time, of which only one is bound to the parent, the parent router may prefer the bound device.

Preferably, router devices may apply the above-described methods to select their physical connections to other neighbour devices than the parent. The memory of embedded devices, whether ZR or ZED, is usually limited, allowing for storing only pre-defined number of neighbors, children and routers. In dense networks, each router may have a number of physical connections that largely exceeds the space available in the neighbor table. Thus when populating the neighbor table, instead of relying solely on the discovery order and/or link cost indicators, the routers could also use the application-layer connection data, such as e.g. the existence of application-layer connection or its priority.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 6 shows a flow chart of the association process of an unconnected seeking device according to an embodiment of the invention;

In the drawings, like numbers refer to like objects throughout. Objects in the diagrams are not necessarily drawn to scale.

DETAILED DESCRIPTION OF THE EMBODIMENTS

In the following, without restricting the invention in any way, it is assumed that the network is a ZigBee-type network since ZigBee is currently the most common wireless mesh networking standard. Nevertheless, the invention may also be used in similar multihop networks.

Figure 1:
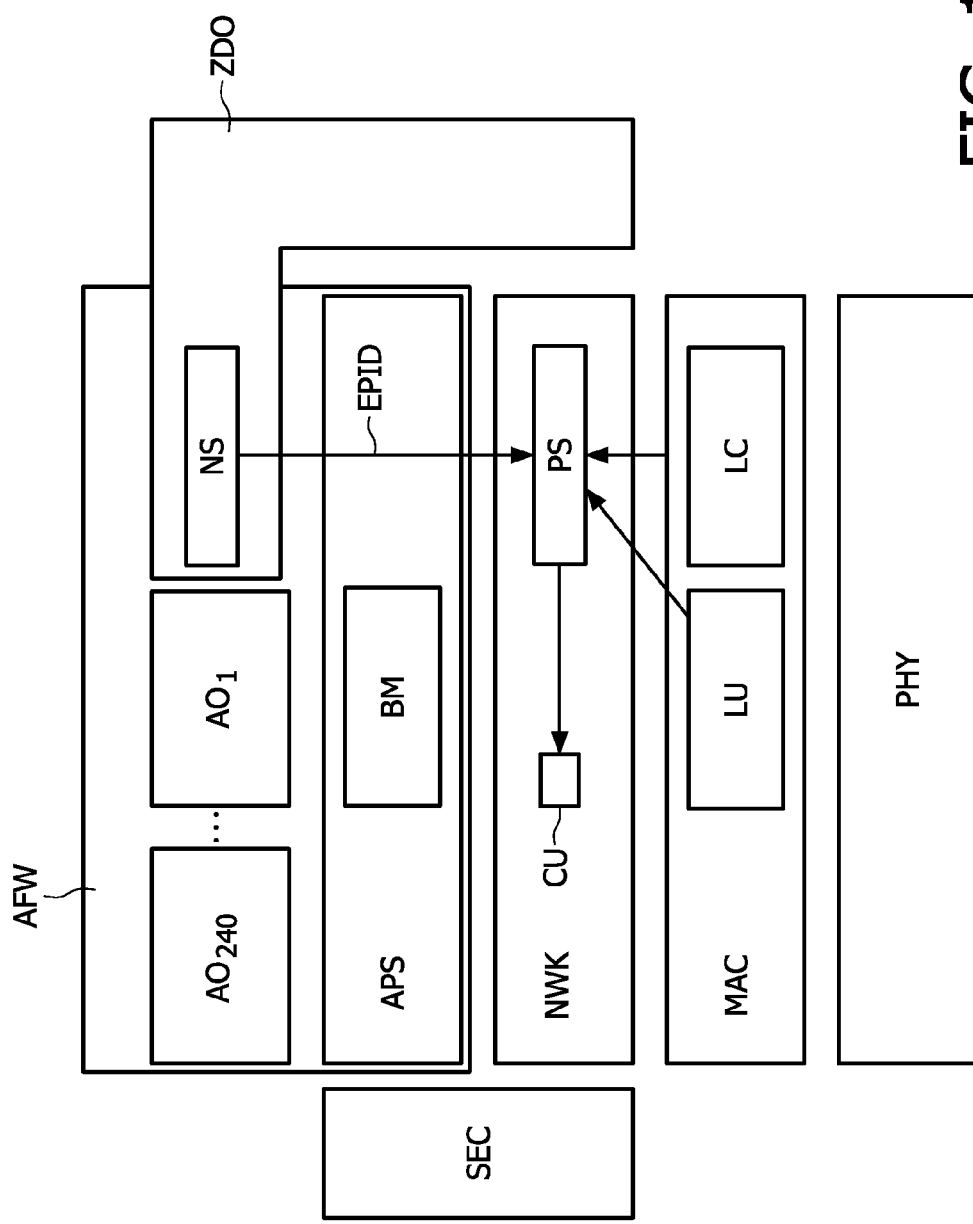
FIG. 1 shows a schematic representation of a ZigBee protocol stack for explanation of the parent selection process according to the current standard.

FIG. 1 shows a typical protocol stack of a ZigBee protocol. ZigBee devices are required to conform to the IEEE 802.15.4-2003 Low-Rate Wireless Personal Area Network (WPAN) standard. The standard specifies the lower protocol layers—the Physical layer PHY, and the Medium Access Control MAC portion of the data link layer. This standard specifies operation in the unlicensed 2.4 GHz, 915 MHz and 868 MHz ISM bands. The Network layer NWK is responsible for addressing and packet routing, providing end-to-end data transmission services to the higher layers of the protocol stack which are part of the Application Framework AF. The Application Framework AF includes an Application Support Sublayer APS, a number (up to 240 per ZigBee device) of Application Objects $AO_1, \ldots, AO_{240}$ and a part of a ZigBee Device Object ZDO. The Application Support Sublayer APS is, for example, responsible for binding management. The Application Objects $AO_1, \ldots, AO_{240}$ are implemented by a developer of the device which uses the ZigBee interface, and may follow a proprietary or standardized ZigBee application profile, such as e.g. Home Automation (HA), Commercial Building Automation (CBA) or Smart Energy (ZSE) profile. The ZigBee Device Object ZDO manages the ZigBee device and is—among others—responsible for the network selection, for the initialisation of the ZigBee Layers (with the exception of the Application Objects $AO_1, \ldots, AO_{240}$), the definition of the actual function of the ZigBee device (ZED, ZR or ZC), the discovery of other devices in the network and the initiation of sending binding requests. A Security Service Provider SEC is responsible for exchanging and maintaining security credentials, as well as security operation, such as encryption and authentication.

Figure 2:
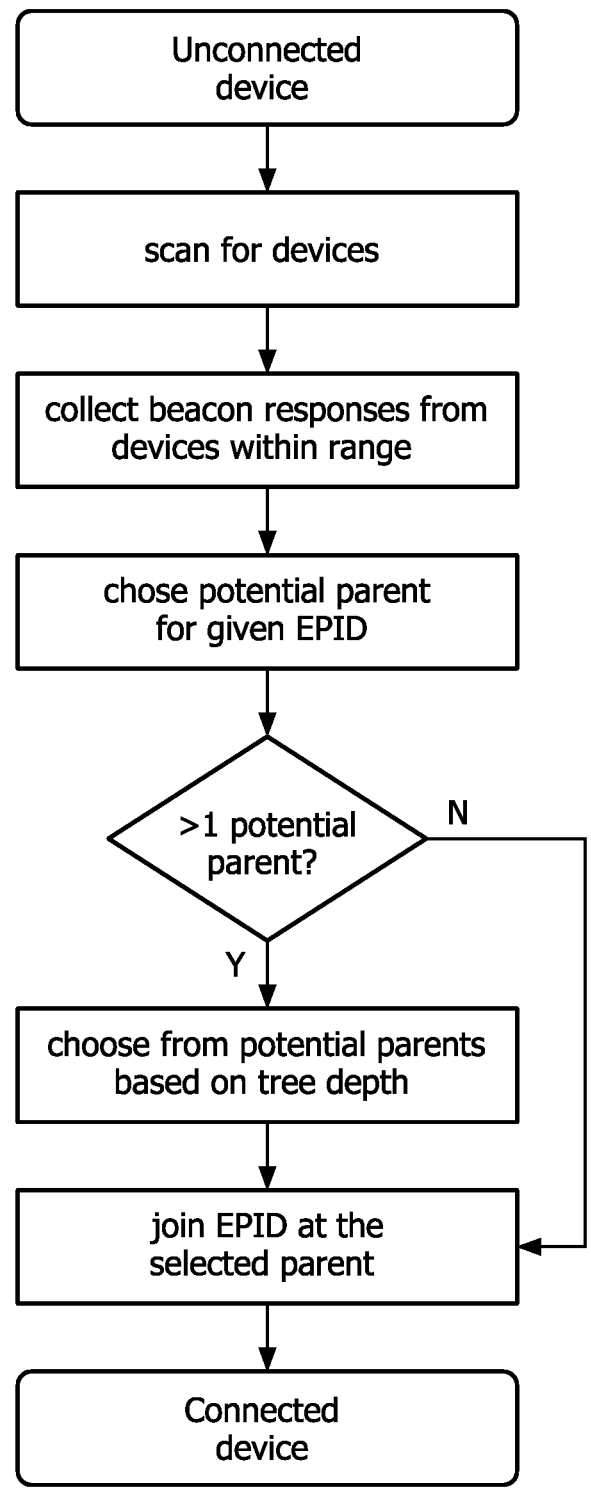
FIG. 2 shows a flow chart of the association process of an unconnected seeking device according to the current standard.

Referring to FIG. 2, it will be roughly explained how an unconnected ZigBee device may join an existing ZigBee network according to the current ZigBee standard. Thereby, the still unconnected seeking device intending to join the network will scan for potential parent devices by broadcasting a request signal, listening for beacon signals from devices within range, and determining the link cost for each responding device. The scan may be performed by a listening unit LU of the Medium Access Control layer MAC (see FIG. 1), and a link cost calculation unit LC may calculate the link costs according to equation (1) above.

The data from the beacon signal of each discovered potential parent device, in particular the network identifier EPID, the 16-bit and the 64-bit addresses, the child acceptance capability and the tree depth, which are all transmitted with the beacon signal, as well as the calculated link costs, are transferred to the Network layer NWK which collects the data of the beacon signals. In the next step, a parent selection unit PS of the Network layer NWK selects a parent device from among the candidate parent devices, according to the ZigBee standard selection criteria 1 to 4 explained above, based on the data received with the beacons and the link costs. To select only parent devices of the correct network, the parent selection unit PS is provided with the network identifier EPID of the selected network from a network selection unit NS of the ZigBee Device Object ZDO.

If only one candidate parent device fulfilling the criteria is found, a connecting unit CU of the Medium Access Control layer MAC will initiate a physical connection (association) to that selected parent device, i.e. the seeking device will join the network with the selected EPID at the selected parent device. If the number of candidate parent devices fulfilling the criteria is greater than one, the parent selection unit will choose the parent device based on the tree depth (criterion 5, mentioned above). The details of such an association process will be known to those skilled in the art, so that no further detailed explanation is needed at this point.

It should be noted that the listening unit LU, the link cost calculation unit LC, the parent selection unit PS, the binding management unit BM, the network selection unit NS and the connection unit CU are all realised as software modules or algorithms running on a processor of the ZigBee interface of the ZigBee device, and are indicated in the specific ZigBee layers in the protocol stack of FIG. 1 for an easier understanding.

It can be shown that this default parent selection mechanism as proposed by the ZigBee specification leads to suboptimal network topologies and, therefore also to suboptimal network performance, especially if ZEDs are involved.

Figure 3:
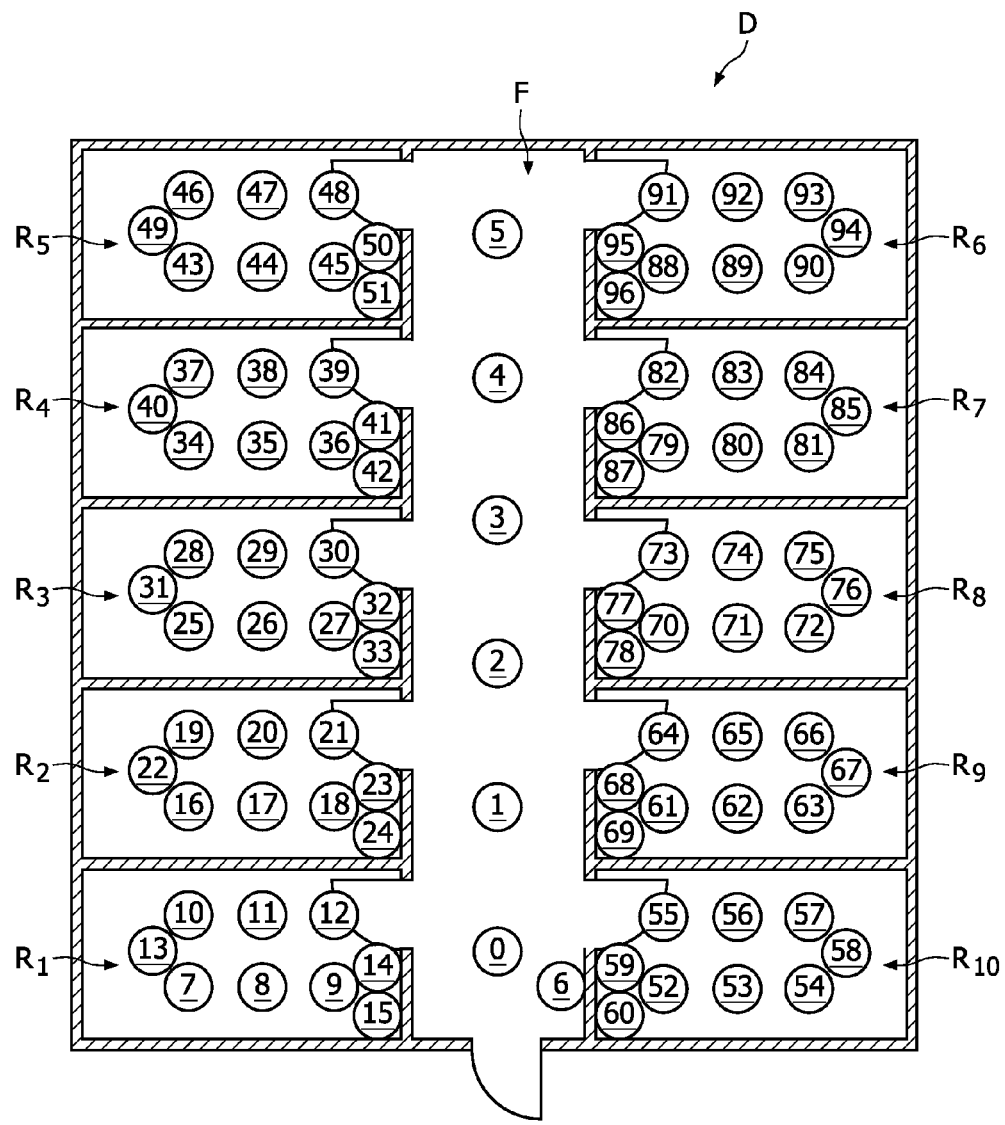
FIG. 3 shows a schematic representation of an embodiment of a device arrangement comprising several functional groups of devices in different rooms.

A device arrangement D in a typical office environment is taken as a benchmark and is shown in FIG. 3. The office environment consists of ten rooms and a corridor leading to each of them. The device arrangement D is in this case a lighting arrangement, but it will be noted at this point that the invention is not in any way restricted to lighting systems.

Each room is equipped with six lamps being ZigBee Routers 7-12, 16-21, 25-30, 34-39, 43-48, 52-57, 61-66, 70-75, 79-84, 88-93, controlled by (i.e. bound to) one switch per room being a ZED 15, 24, 33, 42, 51, 60, 69, 78, 87, 96. In each of the rooms an unbound ZED power outlet 14, 23, 32, 41, 50, 59, 68, 77, 86, 95 and an unbound ZED light sensor 13, 22, 31, 40, 49, 58, 67, 76, 85, 94 are installed. The lamps 0, . . . , 5 in the corridor are controlled by the floor switch 6. All these devices 0, 1, 2, . . . , 96 are grouped into functional groups $R_1, R_2, \ldots, R_{10}$, F according to the room in which the devices are installed. Each device 0, 1, 2, . . . , 96 is represented by a simple circle.

Figure 4:
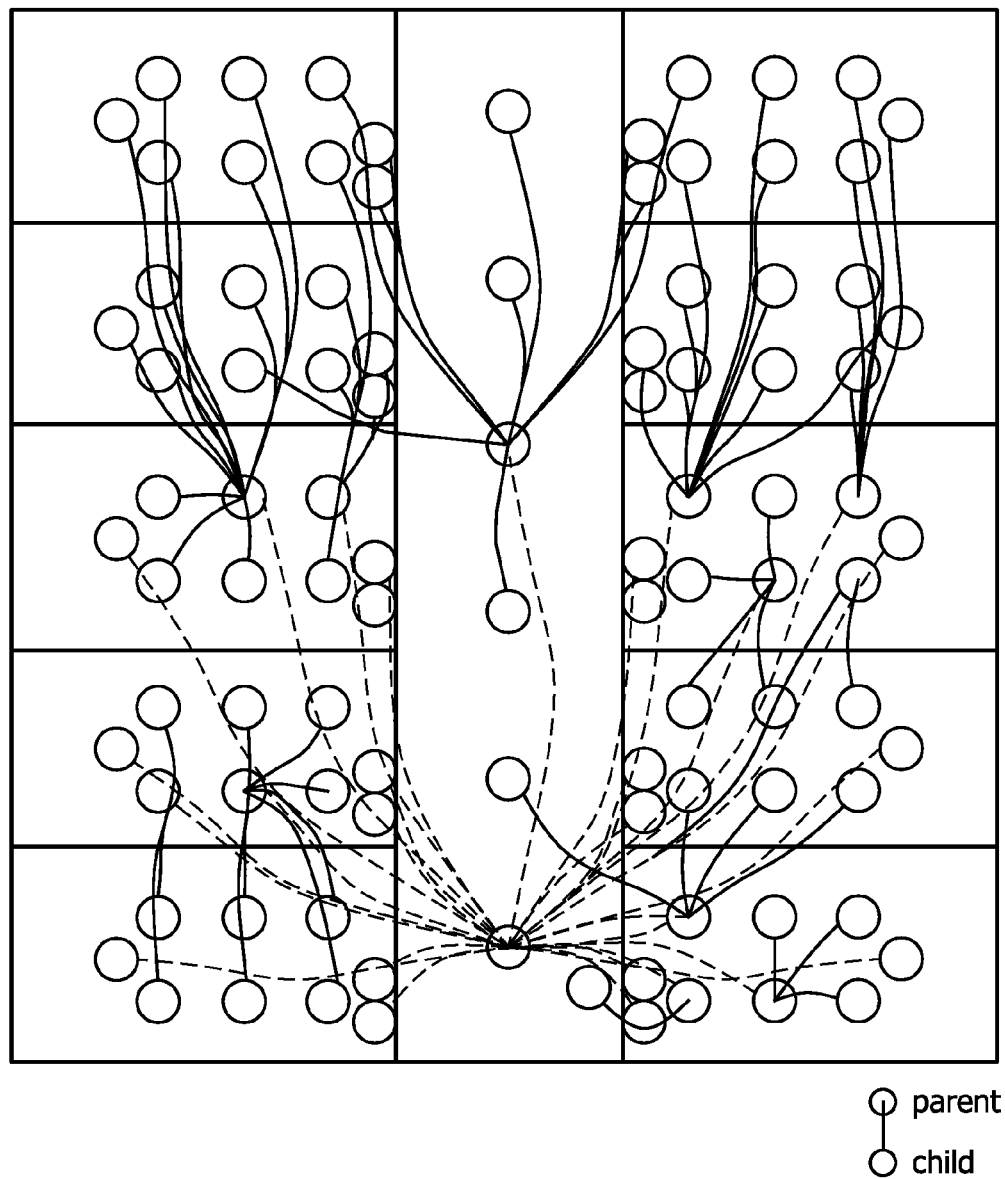
FIG. 4 shows an exemplary ZigBee association graph for the device arrangement of FIG. 3 for a free association tree topology according to the current standard.

For this device arrangement D, an initial network formation is performed according to the standard ZigBee procedure as explained above. It is assumed that reliable link quality parameter values are not yet available (e.g. due to the fact of implementing an integrating function, so that effectively a default value of 7 for the ZigBee link costs is taken), so that parents are selected on the basis of their position (depth) in the network tree. It is further assumed that the device 0 was the first device and acts as the ZigBee coordinator. An exemplary ZigBee association graph for a free association topology achieved with this method is shown in FIG. 4. The ZigBee Cskip parameters for a logical tree formation were set to: Cm=30, Rm=12, Lm=4. Logical connections with a tree depth of "1" are indicated by dashed lines; connections with a tree depth of "2" are indicated by solid lines, whereby the lines originate in the centre of the circle indicating the parent device and terminate at the perimeter of the circle indicating a child device. As can be seen, the node closer to the root (measured in hops along the logical tree structure) is the parent; the node connected to this node is its child.

The performance of this network has been measured using the network simulator 'NS-2'. Thereby, the worst-case scenario was simulated: all eleven switches are toggled at exactly the same moment and each of them sends the message in unicast to all the six associated lamps, resulting in a storm of sixty-six messages. The experiment was repeated 10,000 times, to obtain statistically relevant data. The performance results obtained in the simulation for the association graph shown in FIG. 4 are presented in the following table:

TABLE 1

Simulation results for a network according to the association graph of FIG. 4

| | |
|---|---|
| average fail rate | 23.0% |
| minimum fail rate | 0.2% |
| maximum fail rate | 93.0% |
| average delay (ms) | 304 |
| minimum delay (ms) | 6.6 |
| maximum delay (ms) | 528 |
| delay <200 ms | 22.5% |

As can be seen from the table, on average 23% of the commands did not reach their destination. This poor performance of a free association topology according to the default ZigBee algorithm is caused by long and therefore weak links, resulting in packets getting lost in the collisions due to the hidden node problem. Furthermore, a multi-hop path consisting of a number of weak links increases collision probability for the packet.

To overcome this weakness of the ZigBee standard, the ZigBee devices are realized according to the invention, so that application-level connection information such as binding information and/or grouping information are taken into consideration during the parent selection process.

Figure 5:
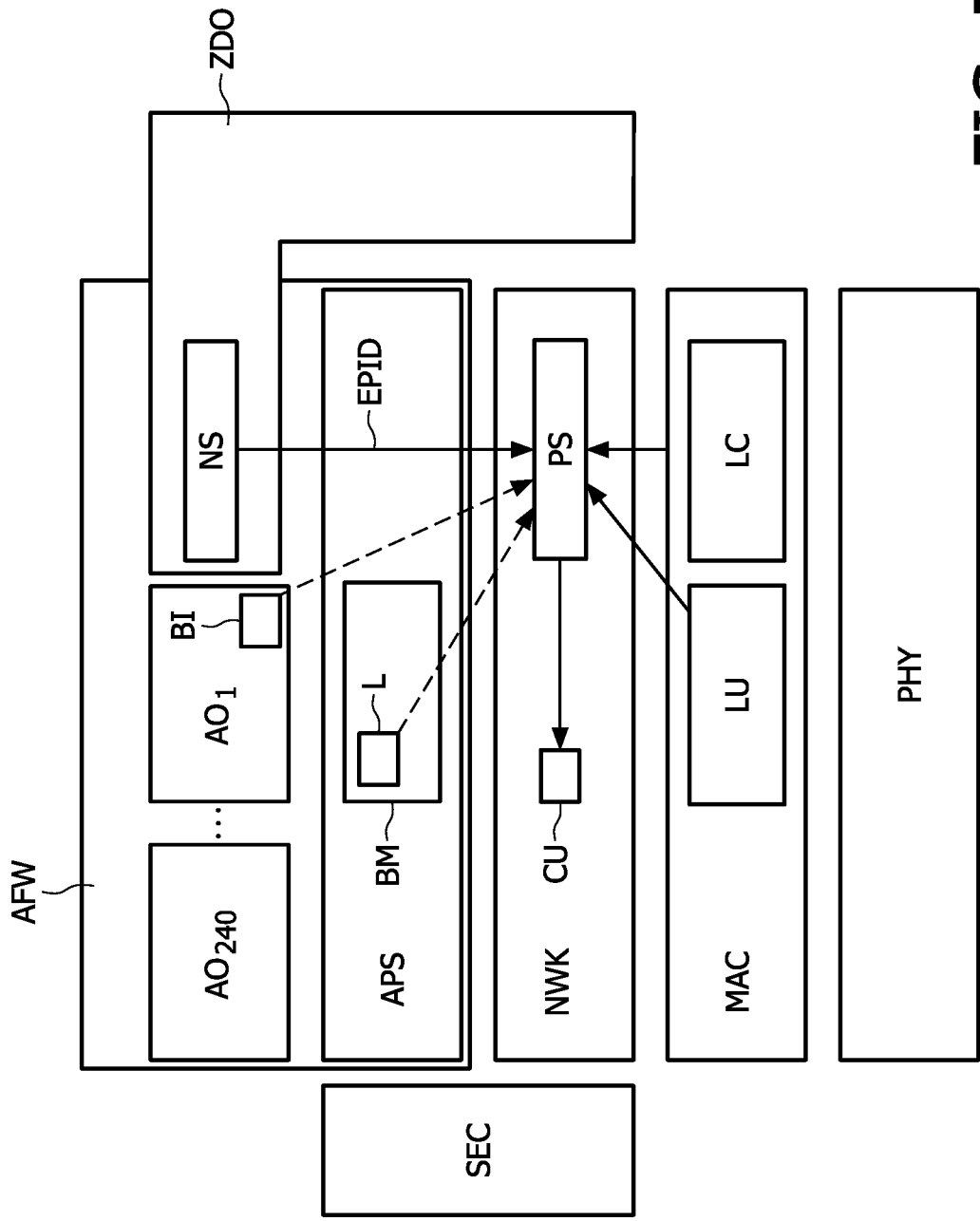
FIG. 5 shows a schematic representation of a ZigBee protocol stack for explanation of the parent selection process according to an embodiment of the invention.

The principle of this modification of the ZigBee standard will be explained with the aid of FIG. 5 and FIG. 6, whereby FIG. 5 is a graphical representation of the ZigBee protocol stack as shown in FIG. 1, and FIG. 6 shows a flow chart of the association process according to an embodiment of the invention.

According to steps I and II of the flow chart, the unconnected device is provided with application-level connection data. This data may be generated in the usual way in a commissioning process, in which the device identifiers are collected and grouped and, as part of the setup, configuration of application logic is performed, i.e. logical connections are configured to establish a control relationship between devices based on properties such as type and location. For example, in a lighting system, it can be specified which switch should control which lamp(s). The configuration of the application logic may be performed using a central commissioning system which transmits the data to the devices via the ZigBee interfaces.

In step III, the device will search for potential parent devices in the usual way by broadcasting the request signal, receiving the beacon signals and determining the link cost for each responding device, using the listening unit LU and the link cost calculation unit LC as explained in connection with FIG. 1 above. In step IV, the data of the beacon of each discovered potential parent device and the calculated link cost are transferred to the Network layer NWK for collecting the data.

Also, the network selection unit NS of the ZigBee Device Object ZDO transfers the network identifier EPID of the selected network to the parent selection unit PS of the Network layer NWK in the usual way.

In contrast to the current standard, the parent selection unit PS is now also provided with application-level connection data or binding information from the binding management unit BM (see FIG. 5). This binding information is available in form of a list L of the 64-bit long addresses of the other devices to which the device is bound. Similar binding information BI may be also provided from the application objects, here as an example from the application object AO1. Normally, the binding management unit BM uses the binding information, which comprises the list L, only to establish the application-layer connection to a destination device when the device itself is already in the network. Using the method according to the invention, the list can now be used to advantage by the parent selection unit PS during the parent selection process. According to step V, the potential parent devices are only selected according to criteria 1-4 mentioned above, from such candidate parent devices to which the device is bound. This can, for example, be ensured by simply comparing the 64-bit addresses in the beacons with the list L from the binding management unit. In this way the bound device with the best link cost will be selected as parent device.

In step VI a check is performed how many potential parent devices have been found in step V. If only one potential parent device has been found, the connecting unit CU of the Medium Access Control layer MAC will initiate an association to this selected parent device, and the device will join the network at the selected parent device in step XII.

If the number of potential parent devices is greater than one, additional application-layer data is considered by the parent selection unit, namely the frequency of the reporting. The frequency of reporting can be obtained by reading the sender endpoint and cluster identifier per the destination 64-bit address from the binding table and then asking the relevant application object. The parent selection unit will then choose, in step VII, the device with the highest estimated reporting frequency, i.e. the potential parent device with which the seeking device will probably most often communicate. If more than one potential parent device has the same highest reporting frequency, which is shown in step VIII, the parent device with the highest priority is chosen. The priority may be defined in the logic configuration process and laid down in the binding table. If more than two devices share the highest priority, the bound device may be selected on the basis of the tree depth (steps X and XI).

If, in step V, no bound device is detected among the devices from which the beacons are received and the list L was not empty, the process—after a waiting time (step XV)—returns to step III and the seeking device scans for other devices again, since the seeking device 'knows' that there may be other devices to which it is bound. To prevent the device from dead-lock in the association procedure, the return to step III is associated with a timeout criterion, for example a given maximum time or a maximum number of scan rounds. If, in step XIV, the timeout criterion is fulfilled, the seeking device follows the usual parent selecting procedure according to the current ZigBee standard in steps XVI, XVII, and possibly XI.

When the parent device is selected, the network is joined via the selected parent device in steps XII and XIII.

Figure 7:
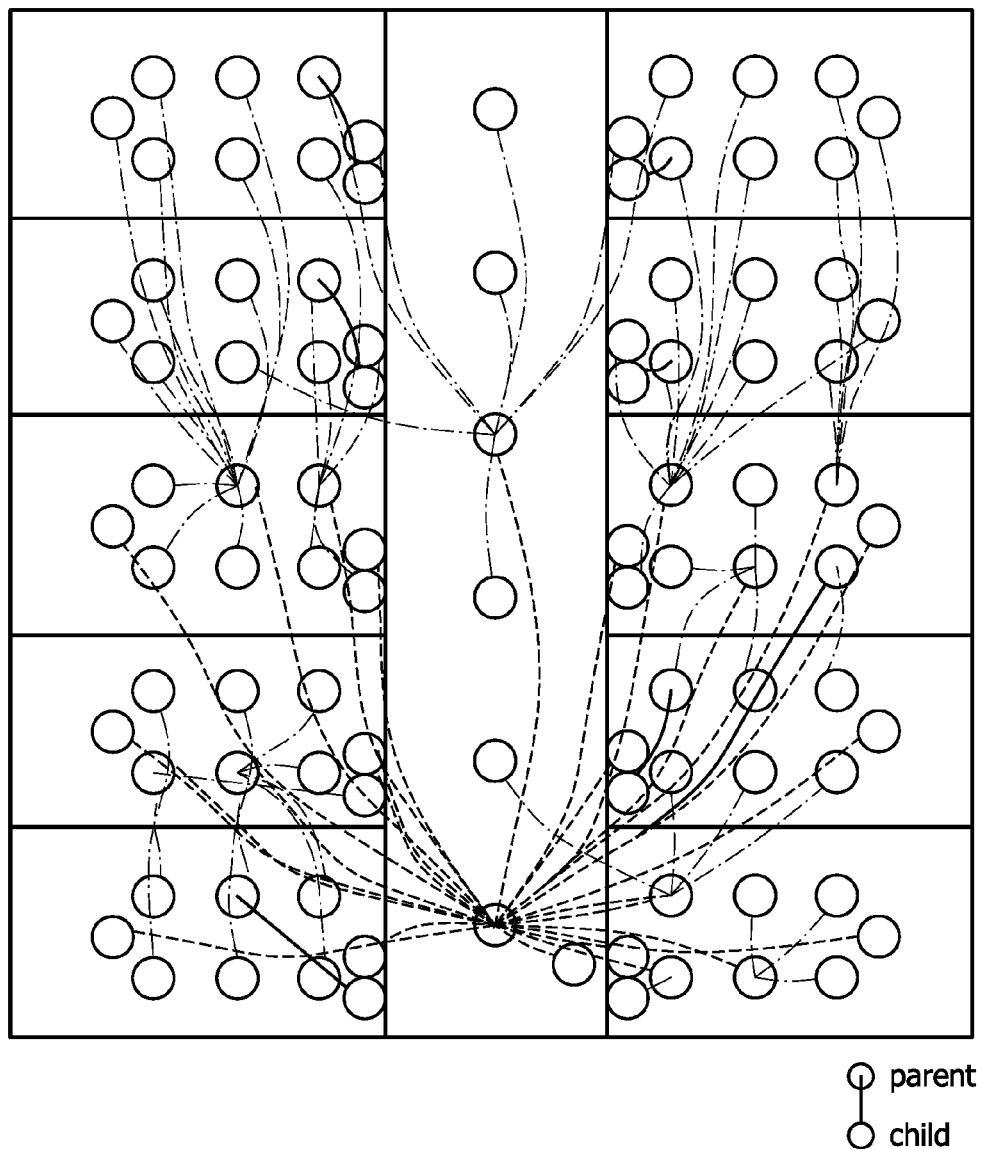
FIG. 7 shows an exemplary ZigBee association graph for the device arrangement of FIG. 3 for a free association tree topology according to an embodiment of the invention.

FIG. 7 shows an exemplary ZigBee association graph for a free association topology in the same office environment as in FIG. 4, but now achieved with the method according to the invention. In this method, as explained above, from potential parents the bound device with the best link cost is chosen. Here, the logical connections with a tree depth of "1" are indicated by dashed lines, the connections with a tree depth of "2" are indicated by dashed-dotted lines, and the connections with the tree depth "3" are in solid lines. The same Cskip parameters as for FIG. 4 were used: Cm=30, Rm=12, Lm=4.

The performance of this network is simulated using the network simulator NS-2, again for the worst case scenario that all eleven switches are toggled at exactly the same moment and each of them sends the message in unicast to all the six bound lamps, resulting in a storm of sixty-six messages. The performance results for the association graph shown in FIG. 7 are presented in the following table:

TABLE 2

Simulation results for a network according to the association graph of FIG. 7

| | |
|---|---|
| average fail rate | 2.01% |
| minimum fail rate | 0.0% |
| maximum fail rate | 62.6% |
| average delay (ms) | 136 |
| minimum delay (ms) | 3.3 |
| maximum delay (ms) | 345 |
| delay <200 ms | 74.8% |

As can be seen from this table in comparison to the results listed in Table 1 for the association graph of FIG. 4, the method offers a tremendous improvement as compared to the benchmark, in terms of delay by a factor of more than 2, from 304 ms to 136 ms and in terms of reliability, since the failure rate is reduced by more than 90%. It should be noted that the worst-case scenario was simulated here with sixty-six messages sent in a dense network at exactly the same time. Obviously, considerably better results will be obtained in a non-worst-case situation.

Although the present invention has been disclosed in the form of preferred embodiments and variations thereon, it will be understood that numerous additional modifications and variations could be made thereto without departing from the scope of the invention. In particular, it should be mentioned that the steps VII to X in the process according to FIG. 6 are optionally. For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A method of establishing a wireless multi-hop network comprising a plurality of devices of a device arrangement for establishing a physical wireless connection between a seeking device and a parent device of the network in a self-organizing process by performing the act of:
the seeking device, intending to join the network, listening for beacon signals emitted by candidate parent devices already in the network comprising network identifiers and device identifiers of the emitting devices;
in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;
in the parent selection process application, applying application-level connection data of at least one of the seeking device and the candidate parent devices; and
physically connecting by the seeking device via the selected parent device to the network,
wherein the beacon signals comprise an acceptance capability of the respective candidate parent device.

2. A method of establishing a wireless multi-hop network comprising a plurality of devices of a device arrangement for establishing a physical wireless connection between a seeking device and a parent device of the network in a self-organizing process by performing the act of:
the seeking device, intending to join the network, listening for beacon signals emitted by candidate parent devices already in the network comprising network identifiers and device identifiers of the emitting devices;
in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;
in the parent selection process application, applying application-level connection data of at least one of the seeking device and the candidate parent devices; and
physically connecting by the seeking device via the selected parent device to the network,
wherein the beacon signal comprises tree depth information of the emitting candidate parent device, which tree depth information is applied in the parent device selection process.

3. A method of establishing a wireless multi-hop network comprising a plurality of devices of a device arrangement for establishing a physical wireless connection between a seeking device and a parent device of the network in a self-organizing process by performing the act of:
the seeking device, intending to join the network, listening for beacon signals emitted by candidate parent devices already in the network comprising network identifiers and device identifiers of the emitting devices;
in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;
in the parent selection process application, applying application-level connection data of at least one of the seeking device and the candidate parent devices; and
physically connecting by the seeking device via the selected parent device to the network,
wherein the level connection data comprise a collection of device identifiers of other devices to which the device should be connected on an application level.

4. A method of establishing a wireless multi-hop network comprising a plurality of devices of a device arrangement for establishing a physical wireless connection between a seeking device and a parent device of the network in a self-organizing process by performing the act of:
the seeking device, intending to join the network, listening for beacon signals emitted by candidate parent devices already in the network comprising network identifiers and device identifiers of the emitting devices;
in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;
in the parent selection process application, applying application-level connection data of at least one of the seeking device and the candidate parent devices; and
physically connecting by the seeking device via the selected parent device to the network,
wherein the seeking device selects as the parent device a device that, on an application-level, acts as a controller for the seeking device or that is, on an application-level, controlled by the seeking device.

5. A method of establishing a wireless multi-hop network comprising a plurality of devices of a device arrangement for establishing a physical wireless connection between a seeking device and a parent device of the network in a self-organizing process by performing the act of:
the seeking device, intending to join the network, listening for beacon signals emitted by candidate parent devices already in the network comprising network identifiers and device identifiers of the emitting devices;
in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;
in the parent selection process application, applying application-level connection data of at least one of the seeking device and the candidate parent devices; and
physically connecting by the seeking device via the selected parent device to the network,
wherein the devices of the device arrangement (D) are grouped into functional groups and the application-level connection data comprises group membership data.

6. A method of establishing a wireless multi-hop network comprising a plurality of devices of a device arrangement for establishing a physical wireless connection between a seeking device and a parent device of the network in a self-organizing process by performing the act of:
the seeking device, intending to join the network, listening for beacon signals emitted by candidate parent devices already in the network comprising network identifiers and device identifiers of the emitting devices;

in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;

in the parent selection process application, applying application-level connection data of at least one of the seeking device and the candidate parent devices; and physically connecting by the seeking device via the selected parent device to the network, wherein the application-level connection data are configured during commissioning of the device arrangement.

7. A method of establishing a wireless multi-hop network comprising a plurality of devices of a device arrangement for establishing a physical wireless connection between a seeking device and a parent device of the network in a self-organizing process by performing the act of:

the seeking device, intending to join the network, listening for beacon signals emitted by candidate parent devices already in the network comprising network identifiers and device identifiers of the emitting devices;

in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;

in the parent selection process application, applying application-level connection data of at least one of the seeking device and the candidate parent devices; and physically connecting by the seeking device via the selected parent device to the network wherein the application-level connection data comprise binding data in at least one of an Application Support Sublayer and application-level connection data are associated to application objects of the devices.

8. A method of establishing a wireless multi-hop network comprising a plurality of devices of a device arrangement for establishing a physical wireless connection between a seeking device and a parent device of the network in a self-organizing process by performing the act of:

the seeking device, intending to join the network, listening for beacon signals emitted by candidate parent devices already in the network comprising network identifiers and device identifiers of the emitting devices;

in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;

in the parent selection process application, applying application-level connection data of at least one of the seeking device and the candidate parent devices; and physically connecting by the seeking device via the selected parent device to the network, wherein a seeking device waits for a given delay time after an initial start-up before seeking a parent device.

9. A method of establishing a wireless multi-hop network comprising a plurality of devices of a device arrangement for establishing a physical wireless connection between a seeking device and a parent device of the network in a self-organizing process by performing the act of:

the seeking device, intending to join the network, listening for beacon signals emitted by candidate parent devices already in the network comprising network identifiers and device identifiers of the emitting devices;

in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;

in the parent selection process application, applying application-level connection data of at least one of the seeking device and the candidate parent devices; and physically connecting by the seeking device via the selected parent device to the network, wherein the seeking device with network router device capability connects physically as a network end device to another router device having no further acceptance capability for a network router device, if the network router device is a most suitable candidate parent device, according to the application-level connection data.

10. A method of establishing a wireless multi-hop network comprising a plurality of devices of a device arrangement for establishing a physical wireless connection between a seeking device and a parent device of the network in a self-organizing process by performing the act of:

the seeking device, intending to join the network, listening for beacon signals emitted by candidate parent devices already in the network comprising network identifiers and device identifiers of the emitting devices;

in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;

in the parent selection process application, applying application-level connection data of at least one of the seeking device and the candidate parent devices; and physically connecting by the seeking device via the selected parent device to the network, wherein the application-level connection data comprise, regarding to a given application-level connection between the seeking device and a device which is bound to the seeking device on an application level, at least one of a quality of service indicator, priority data, and data regarding an estimated application-level message frequency between the seeking device and the respective bound device.

11. A method of establishing a wireless multi-hop network comprising a plurality of devices of a device arrangement for establishing a physical wireless connection between a seeking device and a parent device of the network in a self-organizing process by performing the act of:

the seeking device, intending to join the network, listening for beacon signals emitted by candidate parent devices already in the network comprising network identifiers and device identifiers of the emitting devices;

in a parent selection process, the seeking device selecting the parent device from among the candidate parent devices, according to given selection rules, based on the network identifiers, acceptance capabilities of the candidate parent devices, and link quality parameter values relating the seeking device and the candidate parent devices;

in the parent selection process application, applying application-level connection data of at least one of the seeking device and the candidate parent devices; and physically connecting by the seeking device via the selected parent device to the network, wherein a device already joined in the network may change its parent device if the device receives the application-level connection data.

12. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:

a listening unit which listens, if the device is intending to join the network, for beacon signals emitted by candidate parent devices already in the network comprising a network identifiers and a device identifiers of the candidate parent devices;

a parent selection unit for selecting a parent device from among the candidate parent devices, according to given selection rules, based on the network identifiers, acceptance capabilities of the candidate parent devices, and link quality parameter values relating the device and the candidate parent devices, wherein the parent selection unit is configured to apply at least one of application-level connection data of the device and the candidate parent devices in a parent device selection process; and a connection unit for establishing a physical connection in the network between the device and the selected parent device, wherein the beacon signals comprise an acceptance capability of the respective candidate parent device.

13. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:

a listening unit which listens, if the device is intending to join the network, for beacon signals emitted by candidate parent devices already in the network comprising a network identifiers and a device identifiers of the candidate parent devices;

a parent selection unit for selecting a parent device from among the candidate parent devices, according to given selection rules, based on the network identifiers, acceptance capabilities of the candidate parent devices, and link quality parameter values relating the device and the candidate parent devices, wherein the parent selection unit is configured to apply at least one of application-level connection data of the device and the candidate parent devices in a parent device selection process; and a connection unit for establishing a physical connection in the network between the device and the selected parent device, wherein the beacon signal comprises tree depth information of the emitting candidate parent device, which tree depth information is applied in the parent device selection process.

14. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:

a listening unit which listens, if the device is intending to join the network, for beacon signals emitted by candidate parent devices already in the network comprising a network identifiers and a device identifiers of the candidate parent devices;

a parent selection unit for selecting a parent device from among the candidate parent devices, according to given selection rules, based on the network identifiers, acceptance capabilities of the candidate parent devices, and link quality parameter values relating the device and the candidate parent devices, wherein the parent selection unit is configured to apply at least one of application-level connection data of the device and the candidate parent devices in a parent device selection process; and a connection unit for establishing a physical connection in the network between the device and the selected parent device, wherein the level connection data comprise a collection of device identifiers of other devices to which the device should be connected on an application level.

15. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:

a listening unit which listens, if the device is intending to join the network, for beacon signals emitted by candidate parent devices already in the network comprising a network identifiers and a device identifiers of the candidate parent devices;

a parent selection unit for selecting a parent device from among the candidate parent devices, according to given selection rules, based on the network identifiers, acceptance capabilities of the candidate parent devices, and link quality parameter values relating the device and the candidate parent devices, wherein the parent selection unit is configured to apply at least one of application-level connection data of the device and the candidate parent devices in a parent device selection process; and a connection unit for establishing a physical connection in the network between the device and the selected parent device, wherein the seeking device selects as the parent device a device that, on an application-level, acts as a controller for the seeking device or that is, on an application-level, controlled by the seeking device.

16. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:

a listening unit which listens, if the device is intending to join the network, for beacon signals emitted by candidate parent devices already in the network comprising a network identifiers and a device identifiers of the candidate parent devices;
a parent selection unit for selecting a parent device from among the candidate parent devices, according to given selection rules, based on the network identifiers, acceptance capabilities of the candidate parent devices, and link quality parameter values relating the device and the candidate parent devices,
wherein the parent selection unit is configured to apply at least one of application-level connection data of the device and the candidate parent devices in a parent device selection process; and
a connection unit for establishing a physical connection in the network between the device and the selected parent device,
wherein the devices of the device arrangement (D) are grouped into functional groups and the application-level connection data comprises group membership data.

17. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:
a listening unit which listens, if the device is intending to join the network, for beacon signals emitted by candidate parent devices already in the network comprising a network identifiers and a device identifiers of the candidate parent devices;
a parent selection unit for selecting a parent device from among the candidate parent devices, according to given selection rules, based on the network identifiers, acceptance capabilities of the candidate parent devices, and link quality parameter values relating the device and the candidate parent devices,
wherein the parent selection unit is configured to apply at least one of application-level connection data of the device and the candidate parent devices in a parent device selection process; and
a connection unit for establishing a physical connection in the network between the device and the selected parent device,
wherein the application-level connection data are configured during commissioning of the device arrangement.

18. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:
a listening unit which listens, if the device is intending to join the network, for beacon signals emitted by candidate parent devices already in the network comprising a network identifiers and a device identifiers of the candidate parent devices;
a parent selection unit for selecting a parent device from among the candidate parent devices, according to given selection rules, based on the network identifiers, acceptance capabilities of the candidate parent devices, and link quality parameter values relating the device and the candidate parent devices,
wherein the parent selection unit is configured to apply at least one of application-level connection data of the device and the candidate parent devices in a parent device selection process; and
a connection unit for establishing a physical connection in the network between the device and the selected parent device,
wherein the application-level connection data comprise binding data in at least one of an Application Support Sublayer rand application-level connection data are associated to application objects of the devices.

19. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:
a listening unit which listens, if the device is intending to join the network, for beacon signals emitted by candidate parent devices already in the network comprising a network identifiers and a device identifiers of the candidate parent devices;
a parent selection unit for selecting a parent device from among the candidate parent devices, according to given selection rules, based on the network identifiers, acceptance capabilities of the candidate parent devices, and link quality parameter values relating the device and the candidate parent devices,
wherein the parent selection unit is configured to apply at least one of application-level connection data of the device and the candidate parent devices in a parent device selection process; and
a connection unit for establishing a physical connection in the network between the device and the selected parent device,
wherein a seeking device waits for a given delay time after an initial start-up before seeking a parent device.

20. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:
a listening unit which listens, if the device is intending to join the network, for beacon signals emitted by candidate parent devices already in the network comprising a network identifiers and a device identifiers of the candidate parent devices;
a parent selection unit for selecting a parent device from among the candidate parent devices, according to given selection rules, based on the network identifiers, acceptance capabilities of the candidate parent devices, and link quality parameter values relating the device and the candidate parent devices,
wherein the parent selection unit is configured to apply at least one of application-level connection data of the device and the candidate parent devices in a parent device selection process; and
a connection unit for establishing a physical connection in the network between the device and the selected parent device,
wherein the seeking device with network router device capability connects physically as a network end device to another router device having no further acceptance capability for a network router device, if the network router device is a most suitable candidate parent device, according to the application-level connection data.

21. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:
- a listening unit which listens, if the device is intending to join the network, for beacon signals emitted by candidate parent devices already in the network comprising a network identifiers and a device identifiers of the candidate parent devices;
- a parent selection unit for selecting a parent device from among the candidate parent devices, according to given selection rules, based on the network identifiers, acceptance capabilities of the candidate parent devices, and link quality parameter values relating the device and the candidate parent devices,
- wherein the parent selection unit is configured to apply at least one of application-level connection data of the device and the candidate parent devices in a parent device selection process; and
- a connection unit for establishing a physical connection in the network between the device and the selected parent device,
- wherein the application-level connection data comprise, regarding to a given application-level connection between the seeking device and a device which is bound to the seeking device on an application level, at least one of a quality of service indicator, priority data, and data regarding an estimated application-level message frequency between the seeking device and the respective bound device.

22. A device comprising a network interface for connecting a wireless multi-hop network, wherein the network comprises a plurality of devices of a device arrangement, and wherein the network devices establish a physical wireless connection to at least one other device of the network including a seeking device in a self-organizing process, wherein the network interface comprises:
- a listening unit which listens, if the device is intending to join the network, for beacon signals emitted by candidate parent devices already in the network comprising a network identifiers and a device identifiers of the candidate parent devices;
- a parent selection unit for selecting a parent device from among the candidate parent devices, according to given selection rules, based on the network identifiers, acceptance capabilities of the candidate parent devices, and link quality parameter values relating the device and the candidate parent devices,
- wherein the parent selection unit is configured to apply at least one of application-level connection data of the device and the candidate parent devices in a parent device selection process; and
- a connection unit for establishing a physical connection in the network between the device and the selected parent device,
- wherein a device already joined in the network may change its parent device if the device receives the application-level connection data.

* * * * *